United States Patent
Goedken et al.

Patent Number: 5,519,303
Date of Patent: May 21, 1996

[54] FAST BATTERY CHARGING METHOD AND APPARATUS WITH TEMPERATURE GRADIENT DETECTION

[75] Inventors: Terrance J. Goedken, Mundelein; Daniel J. Theobald, Woodstock, both of Ill.

[73] Assignee: Motorola, Inc., Schaumburg, Ill.

[21] Appl. No.: 129,938

[22] Filed: Sep. 30, 1993

[51] Int. Cl.⁶ .................................................. H02J 7/10
[52] U.S. Cl. ........................................ 320/35; 320/31
[58] Field of Search ........................... 320/31, 32, 35, 320/36, 39, 40, 2, 20, 35

[56] References Cited

U.S. PATENT DOCUMENTS

| | | | |
|---|---|---|---|
| 3,852,652 | 12/1974 | Jasinski | 320/35 |
| 4,392,101 | 7/1983 | Saar et al. | 320/39 X |
| 4,503,378 | 3/1985 | Jones et al. | 320/20 |
| 4,755,735 | 7/1988 | Inakagata | 320/35 |
| 4,806,840 | 2/1989 | Alexander et al. | 320/20 |
| 4,843,299 | 6/1989 | Hutchings | 320/31 |
| 5,059,885 | 10/1991 | Weiss et al. | 320/15 X |
| 5,061,898 | 10/1991 | Oram et al. | 320/13 X |
| 5,315,228 | 5/1994 | Hess et al. | 320/31 |

FOREIGN PATENT DOCUMENTS

| | | | |
|---|---|---|---|
| 2354178 | 5/1974 | Germany | 320/31 |

*Primary Examiner*—Peter S. Wong
*Assistant Examiner*—Patrick B. Law
*Attorney, Agent, or Firm*—Daniel W. Juffernbruch

[57] ABSTRACT

A control circuit and method of operating a battery charging system are provided capable of disabling charging of a rechargeable battery (320) based upon a second derivative (410) of a temperature of the battery. A thermistor (330), contained in a rechargeable battery pack together with the rechargeable battery (320), detects the temperature of the battery. Charging of the battery can be disabled when the second derivative (410) of the temperature of the battery is positive and the first derivative (390) of the temperature of the battery is higher than a predetermined threshold.

7 Claims, 4 Drawing Sheets

5,519,303

FAST BATTERY CHARGING METHOD AND APPARATUS WITH TEMPERATURE GRADIENT DETECTION

BACKGROUND OF THE INVENTION

1. Technical Field of the Invention

The present invention relates to a fast battery charger with temperature detection and, more particularly, relates to a fast battery charger that senses the second derivative of temperature of the charged battery.

2. Description of the Related Art

Rechargeable batteries can be charged by two types of battery chargers, trickle chargers and fast chargers. A trickle charger slowly charges a battery with a current on the order of low hundreds of milliamperes (mA). A trickle charger takes over half a day or so to charge a typical rechargeable radio battery. A fast charger charges a battery with about an Ampere or so of current and takes about one hour to charge a typical rechargeable radio battery. Because fast chargers charge a battery about a magnitude faster than trickle chargers, fast chargers are preferred. However, fast chargers pose additional problems. A battery can be overcharged by a fast charger because of the high current used for charging. Because the trickle charger has a low current, the battery can itself prevent further charging if the cells are designed to accept a continuous overcharge. A fast charger, on the contrary, requires circuitry to discontinue charging of the battery. Without such circuitry, the fast charger will overcharge the battery, risking damage to the battery. Overcharging can shorten battery life by heating up and deteriorating a separator in the cells or by causing high pressure to vent the cell resulting in non-recoverable lost capacity.

Early techniques for controlling the charge of a battery used timers. A timer limited the charge of the battery to a fixed period of time such as, for example, an hour. After an hour, the timer would stop the charge amperage. These timer circuits, however, assumed they were starting with an empty battery. These timer circuits overcharged a full or partly charged battery.

U.S. Pat. No. 4,806,840 discloses circuits for controlling charge based on a first derivative of the voltage of the battery. The first derivative sensed the rate of change of the voltage. When a predetermined negative rate of change of the voltage was sensed, the charging is discontinued. However, the battery must be overcharged before the charging is discontinued. To reduce the overcharge, U.S. Pat. No. 4,503,378 senses the second derivative of voltage to control the charge. The second derivative detects where the slope of the battery voltage changes from increasing to decreasing. Thus charging is discontinued when only the second derivative of voltage switches. This technique of sensing voltage, however, does not charge the battery to its fullest capacity and is susceptible to premature tripping.

Other circuits detect the temperature of the battery and ceased charge when the battery reached a fixed temperature such as, for example, 40° C. These charging circuits also cause the battery to sometimes be undercharged or overcharged. A charge circuit for controlling the charge based on a first derivative of sensed temperature of the battery is disclosed by U.S. Pat. Nos. 3,852,652 and 4,755,735. A first derivative of temperature provides a signal representative of the rate of change of the temperature of the battery. When the rate of the change of the temperature exceeds a predetermined threshold, charging of the battery is discontinued. When the battery temperature is significantly below ambient temperature, however, the previously known techniques of charge control prematurely trip and prevent full charge of the battery. When the battery is brought indoors for charging after being outdoors in a cold automobile, battery temperature will rapidly rise to indoor ambient temperature. A rapid rate of battery temperature change causes a high first derivative, for example, that reaches the predetermined threshold early and prematurely trips with an insufficient charge on the battery.

SUMMARY OF INVENTION

The present invention solves these and other problems by providing a fast battery charging method and apparatus with temperature gradient detection. Charging of a battery is disabled based on a second derivative of temperature of the battery. A temperature sensor senses the temperature of the battery during charging. According to different embodiments, charging can be disabled when a second derivative of the temperature of the battery is positive and a first derivative of the temperature of the battery is higher than a predetermined threshold. Charging can additionally be disabled based upon a voltage of the battery. The temperature sensor can be a thermistor or other element proximal to the battery inside a battery pack.

These and other constructions and features of the present invention will become more apparent from the following detailed description when read in conjunction with the accompanying drawings.

DETAILED DESCRIPTION OF THE DRAWINGS

FIGS. 1 and 2 illustrate a battery pack and charging base according to the present invention.

FIGS. 3(A), 3(B), 4(A), 4(B), 5(A) and 5(B) illustrate respective plots of battery temperature, temperature slope and temperature gradient with respect to time of the charging of a battery according to the present invention.

DETAILED DESCRIPTION OF THE PREFERRED EMBODIMENTS

Figure 1:
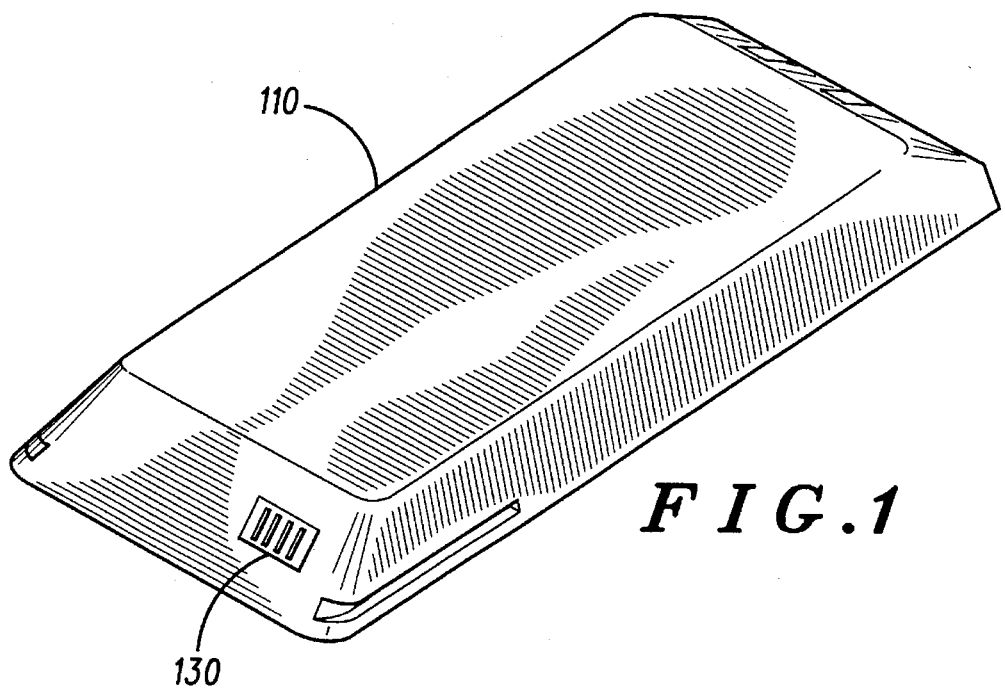
Figure 2:
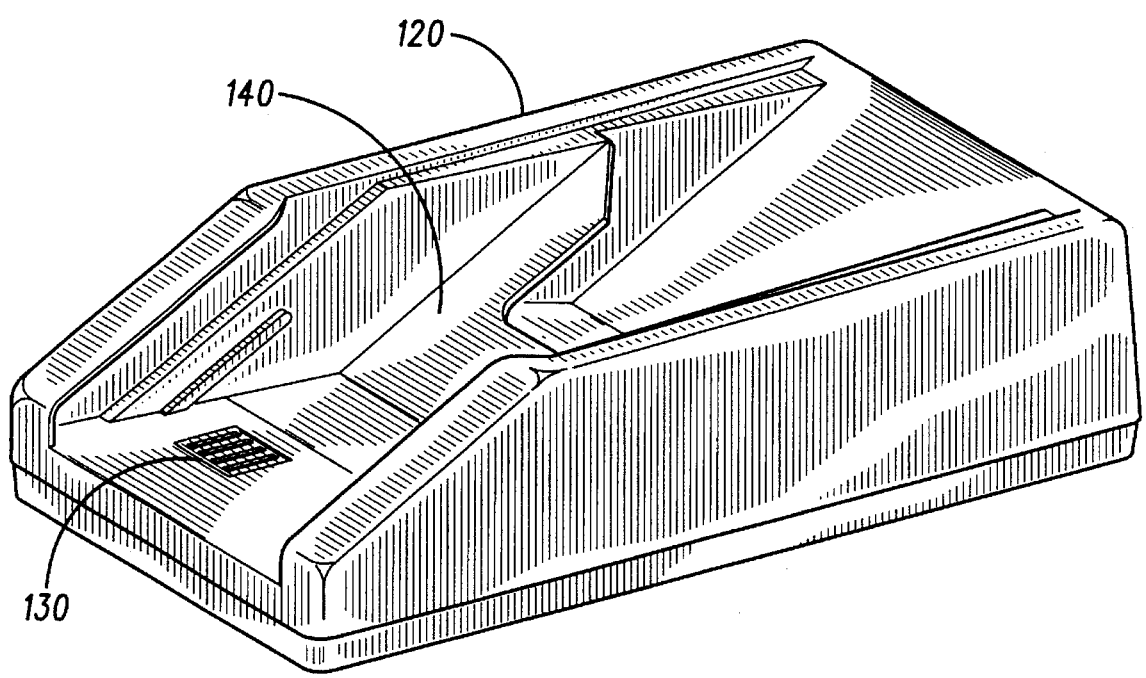

FIG. 1 illustrates a battery pack 110 having contacts 130 for coupling to a charging base. The battery pack 110 contains a rechargeable battery and a thermistor to sense a temperature of the rechargeable battery. FIG. 2 illustrates the charging base 120 having at least one receptacle 140 for holding the battery pack 110 with the contacts 130 coupled thereto. A charging control circuit is contained in the charging base 120. The charging control circuit disables charging of the battery in the battery pack 110 based upon a second derivative of the temperature of the rechargeable battery.

Figure 3A:
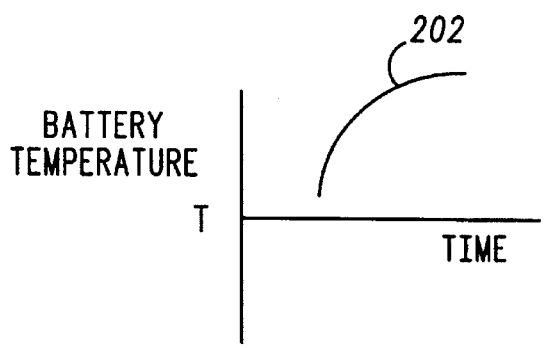
Figure 3B:
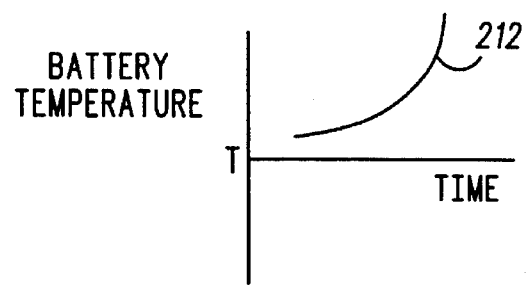

FIGS. 3(A), 3(B), 4(A), 4(B), 5(A) and 5(B) illustrate respective plots of battery temperature, temperature slope and temperature gradient with respect to time of the charging of a battery. Plot 202 of FIG. 3(A) illustrates a rising temperature of the battery which can occur when a battery, for example, is brought indoors for charging after being outdoors in a cold environment. Plot 202 shows the battery temperature rapidly rising during warming to indoor ambient temperature. Plot 212 of FIG. 3(B) illustrates the battery temperature after the battery reaches full charge. If a charging voltage remains connected to the battery after the battery becomes fully charged, the temperature of the battery increases according to the plot 212. Plot 212 illustrates the temperature of the battery in overcharge.

Figure 4A:
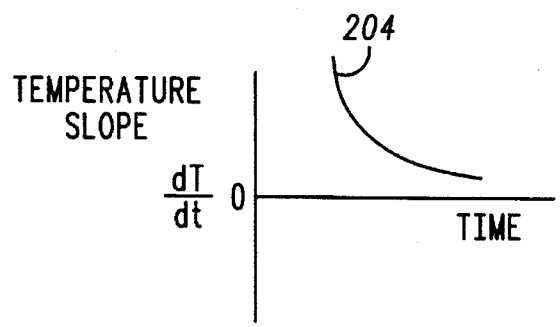
Figure 4B:
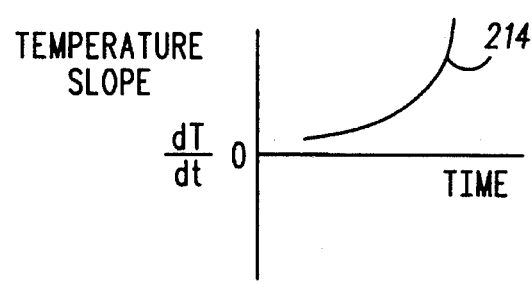

Plot 204 of FIG. 4(A) illustrates the rate of change of the temperature of the battery when warming to indoor ambient temperature. Plot 204 is the first derivative of plot 202 and represents the rate of change of the temperature. Plot 214 of FIG. 4(B) illustrates the rate of change (first derivative) of the temperature of the battery in overcharge, when the charging voltage remains connected to the battery after the battery becomes fully charged.

FIG. 4(A) demonstrates by plot 204 how a charge circuit for controlling charge, based on a first derivative, will prematurely trip and cause insufficient charging of the battery. As the battery warms to ambient temperature, the temperature of the battery can rapidly increase causing a high temperature slope value in plot 204. The present invention solves these problems while still maintaining the advantages of sensing temperature to determine when a rechargeable battery is fully charged. In the present invention, the second derivative of temperature can be used to determine when a rechargeable battery is fully charged.

Figure 5A:
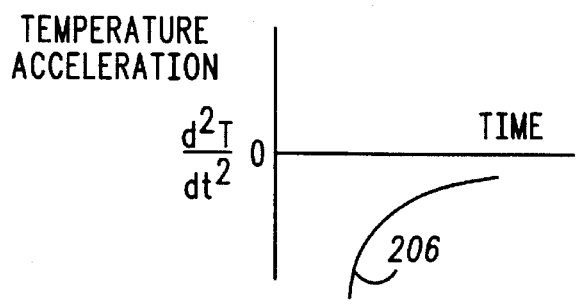
Figure 5B:
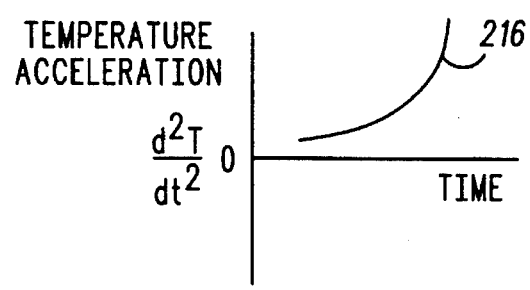

FIG. 5(A) illustrates the second derivative of temperature of the battery for warming to ambient by plot 206, and FIG. 5(B) illustrates the second derivative of temperature of the battery in overcharge by plot 216. The difference between a battery warming to ambient in plot 206 and a battery in overcharge in plot 216 is easy to detect based upon the second derivatives in the two plots of FIGS. 5(A) and 5(B). The upward and downward slopes of plots 204 and 214 can be ascertained, for example, by the simple polarity of the plots in FIGS. 5(A) and 5(B). Plot 206 values are negative while the values of plot 216 are positive. Detection of a zero cross or threshold indicates if the battery is in overcharge while preventing premature disabling of charging when the battery is warming to ambient.

Figure 6:
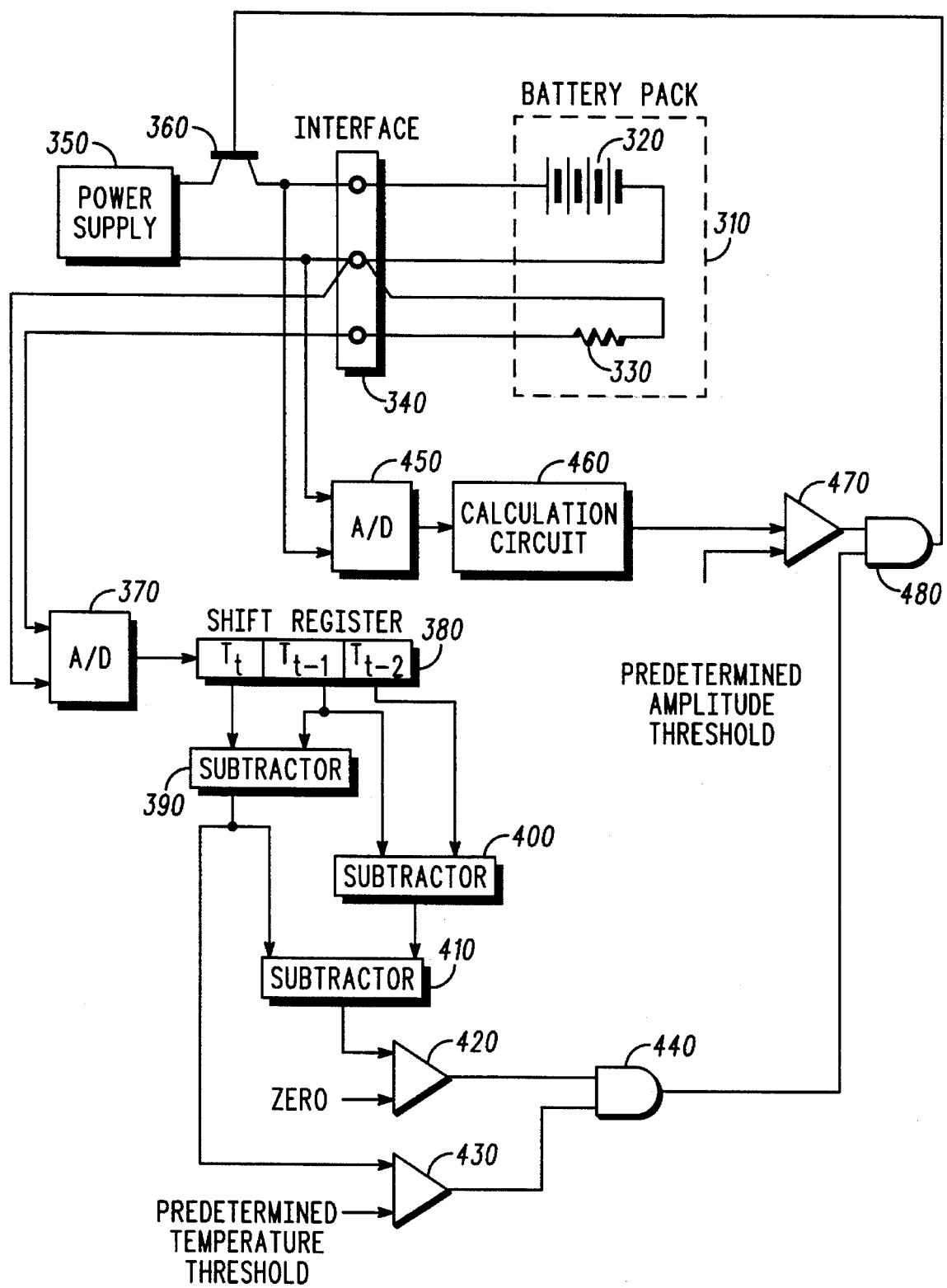
FIG. 6 illustrates a schematic block diagram according to a preferred embodiment of the present invention.

FIG. 6 illustrates a schematic block diagram according to a preferred embodiment of the present invention. A battery pack 310 contains a rechargeable battery 320 and a thermistor 330. The rechargeable battery 320 and the thermistor 330 of the battery pack 310 connect, via an interface 340, to a charging control circuit of a charging base. The interface 340 provides contacts for selectively connecting the charging circuit to the battery pack.

A power supply 350 provides power to charge the rechargeable battery 320 via the interface 340. A transistor switch 360 or other appropriate relay or semiconductor devices enables and disables charging of the battery. The thermistor 330 of the battery pack 310 is a resistive device that changes resistance with respect to temperature. Although a thermistor is used by example, other devices whose characteristics vary predictively with temperature can be substituted for the thermistor.

In the embodiment of FIG. 6, the thermistor 330 is capable of providing a variable voltage on an input of an analog-to-digital converter 370. Typically, a power source will be required to apply a voltage which is divided between the thermistor 330 and a fixed resistor at the input of the analog-to-digital converter 370. Thus, the output of the analog-to-digital converter 370 provides measurements of temperature of the rechargeable battery 320 at instances in time.

A shift register 380 stores and delays measurements of the temperature of the rechargeable battery 320 for various instances in time. The embodiment illustrated in FIG. 6 calculates the derivatives of temperature based upon three instances of temperature ($T_t$, $T_{t-1}$ and $T_{t-2}$). The present and once previous temperatures ($T_t$ and $T_{t-1}$) are subtracted by a subtractor circuit 390. The output of the subtractor circuit 390 provides an approximation of a first derivative of the temperature. Similarly, the previous and twice previous temperatures ($T_{t-1}$ and $T_{t-2}$) from the shift register 380 are subtracted by subtractor circuit 400. The outputs of subtractor circuits 390 and 400 are subtracted by another subtractor circuit 410 to provide an approximation of a second derivative of the temperature of the rechargeable battery 320.

A comparator 420 compares the approximation of the second derivative with zero to determine if the second derivative is positive or negative. A comparator 430 compares an approximation of the first derivative with a predetermined temperature threshold to determine if the first derivative of the rechargeable battery is above this predetermined temperature threshold. This predetermined temperature threshold should preferably have a trip limit of approximately 2° C. per three minutes for a typical nickel metal hydride (NiMH) battery. The actual trip limit depends upon the battery type, battery size, and physical configuration of the battery cells.

An AND gate 440 combines the threshold determinations of the outputs of the comparators 420 and 430 to provide signal for controlling of charging of the rechargeable battery 320 via the transistor switch 360. The charge controller of the present invention will operate if the output of the comparator 420 alone is used to control the transistor switch 360 in a first embodiment. However, use of both the outputs of comparators 420 and 430 is preferred in a second embodiment.

In addition to the second derivative of temperature embodiments discussed above, the transistor switch 360 can additionally be controlled in different embodiments based upon the voltage of the battery. An analog-to-digital converter 450 detects the voltage across the rechargeable battery 320 via the interface 340. A calculation circuit 460 calculates a derivative of the voltage based on an output of the analog-to-digital converter 450. The derivative of the voltage can be calculated as an approximation. The approximation can be calculated using a shift register and a subtractor, such as shift register 380 and subtractor 390 discussed above with respect to the calculation of the derivative of the temperature. A comparator 470 compares the voltage derivative value output of calculation circuit 460 with a predetermined amplitude threshold. The calculation circuit 460 can alternatively calculate a second derivative of the voltage of the rechargeable battery for comparison with a different amplitude threshold in the comparator 470.

Derivatives of both the temperature and the voltage of the rechargeable battery can be used to control charging of the rechargeable battery 320 by the power supply 350. An AND gate 480 combines a temperature control output of the comparator 440 with a voltage control output of a comparator 470. This combination is used to control transistor switch 360 and enable and disable charging of the rechargeable battery 320 in these different embodiments.

In another embodiment of the present invention, the control circuitry for driving the transistor 360 can be provided by a microprocessor. For example, a Motorola 6805 microcontroller contains built-in analog-to-digital converters and is capable of driving a switch such as the transistor switch 360. The control circuit illustrated in FIG. 6 can be embodied in such a microcontroller for an alternative implementation of the invention. The microcontroller can be programmed to calculate approximations of the derivatives using the subtractions discussed above with respect to FIG. 6. Alternatively, the microcontroller can be programmed to perform more mathematically accurate but complex methods of calculating the derivatives.

Figure 7:
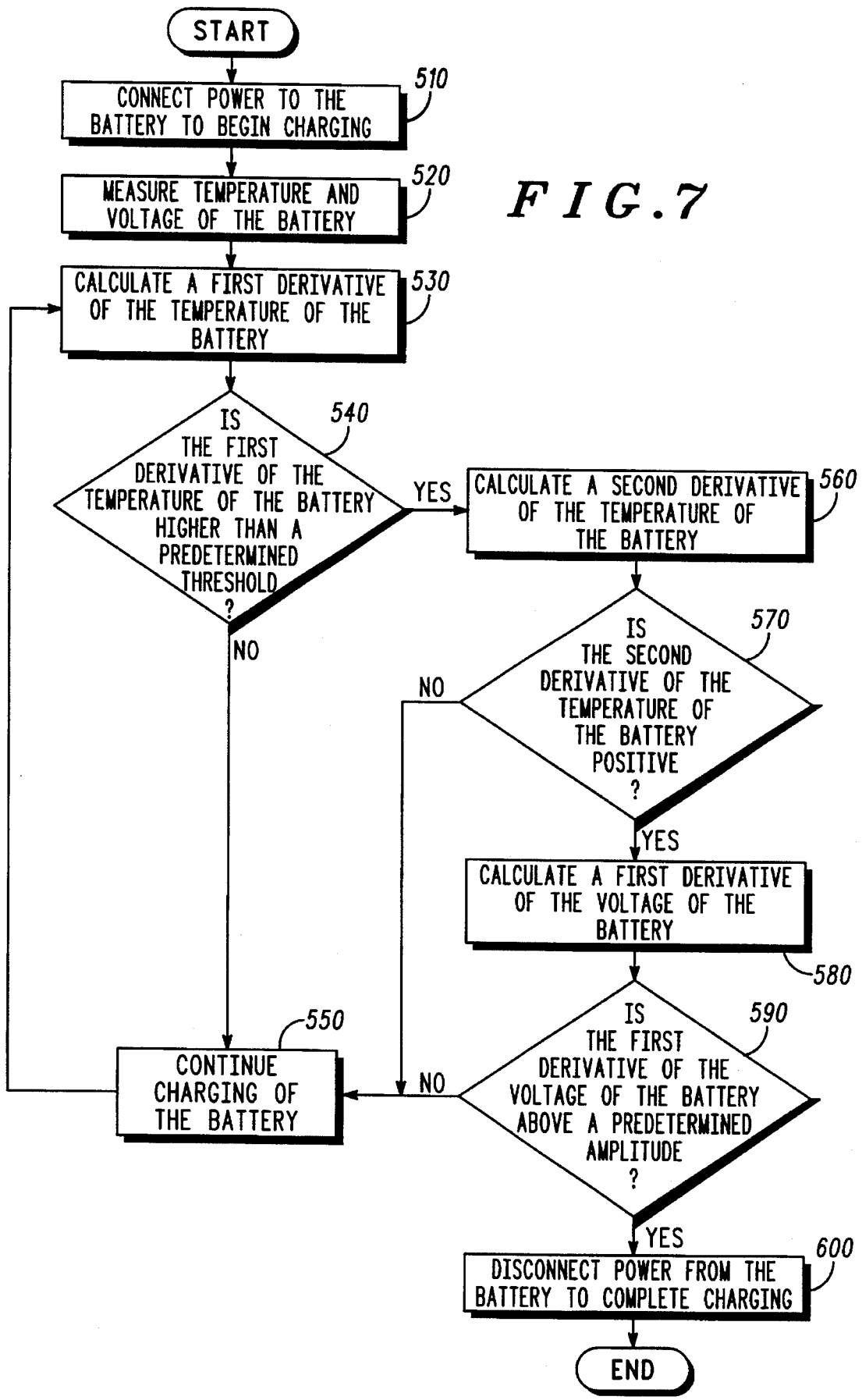
FIG. 7 illustrates a flow chart of a method according to a preferred embodiment of the present invention.

FIG. 7 illustrates a method according to a preferred embodiment of the present invention. Step 510 initiates charging of the rechargeable battery by connecting power to tile battery to begin charging. After power is connected to the battery in step 510 to begin charging, the temperature and voltage of the battery are measured in step 520. Based on the temperature of the battery measured in step 520, a first derivative of the temperature of the battery is calculated in step 530. Thereafter, in step 540, the first derivative of the temperature of the battery is compared with a predetermined threshold. If the first derivative of the temperature of the battery is not higher than the predetermined threshold, flow continues via step 550 back to step 530. However, if the first derivative of the temperature is higher than the predetermined threshold, flow proceeds to step 560. In step 560, a second derivative of the temperature of the battery is calculated. Thereafter, the second derivative of the temperature of the battery is compared to determine if the second derivative is positive. If the second derivative of the temperature of the battery is not positive, flow proceeds through step 550 back to step 530. However, if the second derivative of the temperature of the battery is positive, charge of the battery is very likely complete, and charge can be disabled at this time.

The voltage of the battery also can be examined for assurance that the battery is fully charged. If the second derivative of the temperature of the battery is positive as determined in step 570, flow can proceed to step 580. In step 580, the first derivative of the voltage of the battery is calculated. Thereafter, if the first derivative of the voltage of the battery is above a predetermined amplitude in step 590, the power can be disconnected from the battery to complete charging in step 600. However, in the event the first derivative of the voltage of the battery is not above a predetermined amplitude, flow can proceed from step 590 via step 550 back trio step 530.

Although the invention has been described and illustrated in the above description and drawings, it is understood that this description is by example only. For example, the temperature sensor can be any element whose characteristics vary predictively with temperature. Numerous changes and modifications can be made by those skilled in the art without departing from the true spirit and scope of the invention.

What is claimed is:

1. A control circuit for charging a battery, comprising:

a temperature sensor for sensing a temperature of the battery;

a first derivative calculating means for calculating a first derivative of the temperature of the battery;

a second derivative calculating means for calculating a second derivative of the temperature of the battery; and a switch operatively coupled to said temperature sensor, said first derivative calculating means and said second derivative calculating means for disabling charging of the battery when both the second derivative of the temperature of the battery is positive and the first derivative of the temperature of the battery is above a predetermined threshold.

2. A control circuit for charging a battery according to claim 1, wherein said temperature sensor includes a pair of contacts coupled thereto.

3. A control circuit for charging a battery according to claim 1, wherein said temperature sensor comprises a thermistor.

4. A battery charger for charging a battery pack, comprising:

a plurality of contacts for mating with the battery pack, at least a pair of said contacts providing a temperature signal indicative of a temperature of the battery pack;

a derivative calculating circuit operatively coupled to said pair of contacts to receive the temperature signal for calculating derivatives of the temperature of the battery pack; and a switch operatively connected to said derivative calculating circuit to disable charging of the battery pack when both a second derivative of the temperature of the battery pack is positive and a derivative of the temperature of the battery pack is above a predetermined threshold.

5. A battery charger according to claim 4 further comprising a charger base having at least one receptacle for holding the battery pack with said contacts of the charger base coupled thereto.

6. A battery charging system, comprising:

a rechargeable cell having a temperature sensor configured to sense a temperature of the rechargeable cell;

a derivative calculating circuit connectable to said rechargeable cell for calculating derivatives of the temperature of the rechargeable cell; and a switch operatively connected to said derivative calculating circuit to disable charging of the rechargeable cell when both a second derivative of the temperature of the rechargeable cell is positive and a derivative of the temperature of the rechargeable cell is above a predetermined threshold.

7. A method of charging a battery, comprising:

(a) sensing a temperature of the battery;

(b) calculating a first derivative of the temperature of the battery;

(c) calculating a second derivative of the temperature of the battery; and (d) disabling charging of the battery when both the second derivative of the temperature of the battery is positive and the first derivative of the temperature of the battery is above a predetermined threshold.

* * * * *

UNITED STATES PATENT AND TRADEMARK OFFICE
CERTIFICATE OF CORRECTION

PATENT NO. : 5,519,303
DATED : May 21, 1996
INVENTOR(S) : Goedken et al.

It is certified that error appears in the above-indentified patent and that said Letters Patent is hereby corrected as shown below:

TITLE PAGE

Item [75] Inventors:

Please replace "Daniel" with --David--.

Signed and Sealed this

First Day of October, 1996

Attest:

BRUCE LEHMAN

Attesting Officer        Commissioner of Patents and Trademarks